United States Patent [19]
Aoki

[11] Patent Number: 5,402,529
[45] Date of Patent: Mar. 28, 1995

[54] PRINTER CONTROLLER CAPABLE OF APPROXIMATING CURVED SEGMENTS OF ORIGINAL FIGURE OUTLINE BY STRAIGHT SEGMENTS WITH ADJUSTABLE APPROXIMATION ACCURACY

[75] Inventor: Kazuma Aoki, Kasugai, Japan

[73] Assignee: Brother Kogyo Kabushiki Kaisha, Aichi, Japan

[21] Appl. No.: 120,394

[22] Filed: Sep. 13, 1993

[30] Foreign Application Priority Data

Sep. 16, 1992 [JP] Japan ................................. 4-246434

[51] Int. Cl.$^6$ ............................................. G06F 15/00
[52] U.S. Cl. ..................................... 395/110; 395/115
[58] Field of Search ............... 395/110, 113, 115, 116, 395/142, 150, 151, 164; 400/61–63, 70, 76; 358/433, 404, 444; 382/11–14, 47, 56, 54; 345/16, 23, 25, 26, 128, 129, 130, 141, 143

[56] References Cited

U.S. PATENT DOCUMENTS 4,542,412  9/1985  Fuse et al. ........................... 398/433
4,688,182  8/1987  Schreiber ............................ 395/142

*Primary Examiner*—Arthur G. Evans
*Attorney, Agent, or Firm*—Oliff & Berridge

[57] ABSTRACT

A printer controller wherein original outline data representative of the outline of a figure are converted by an approximating device into approximative outline data including straight segment data representative straight segments which approximate curved segments of the original outline. The approximating device is adapted to lower the accuracy of approximation of the curved segments by the straight segments, until the amount of the approximation data is reduced to such an extent that the approximative data can be entirely stored in a currently available empty area of a random-access memory, before the approximative data are converted into bit map data representative of image dots filling the interior of the figure outline.

12 Claims, 9 Drawing Sheets

| ATTRIBUTE FLAGS | COORDINATE DATA |
|---|---|
| S | (x0,y0) |
| L | (x1,y1) |
| B | (x2,y2), (x3,y3), (x0,y0) |
| S | (x4,y4) |
| B | (x5,y5), (x6,y6), (x7,y7) |
| L | (x4,y4) |

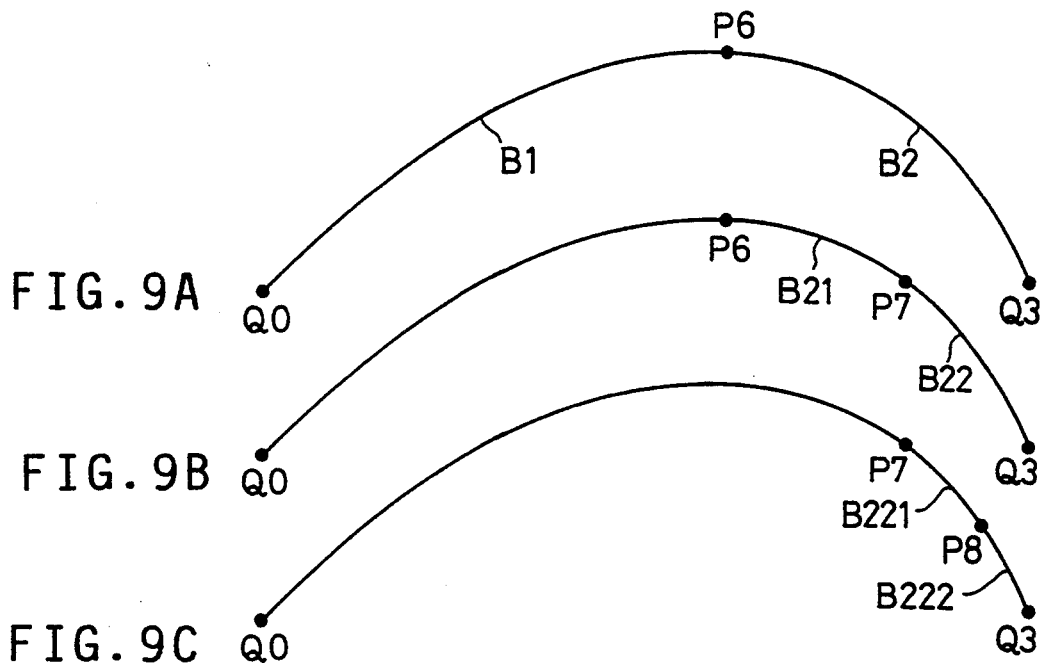
FIG. 9A
FIG. 9B
FIG. 9C
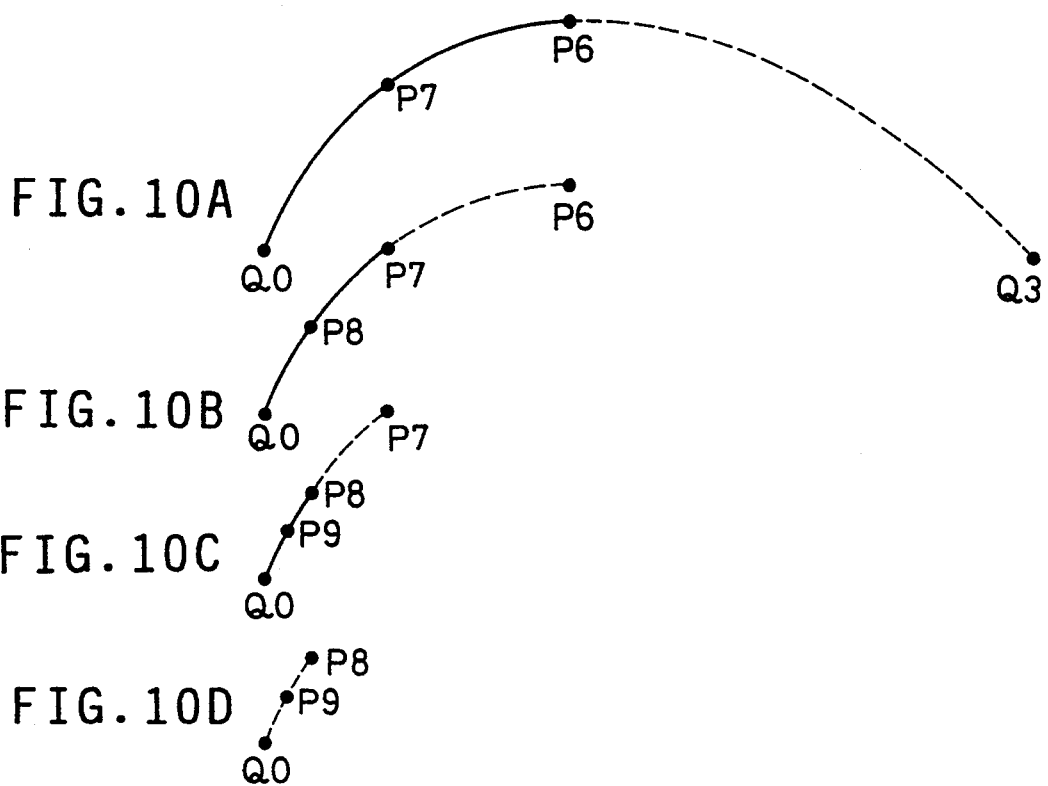
FIG. 10A
FIG. 10B
FIG. 10C
FIG. 10D

PRINTER CONTROLLER CAPABLE OF APPROXIMATING CURVED SEGMENTS OF ORIGINAL FIGURE OUTLINE BY STRAIGHT SEGMENTS WITH ADJUSTABLE APPROXIMATION ACCURACY

BACKGROUND OF THE INVENTION

1. Field of the Invention

The present invention relates to a controller for a printer, which is adapted to convert a batch of outline data representative of the outline of a figure such as a character, into a batch of bit map data representative of image dots that fill the interior of the outline of the figure.

2. Discussion of the Related Art

Various methods are available in the field of obtaining bit map data by conversion from original outline data which represent the outline or contour of a character or other figure consisting of straight and/or curved segments. One of these methods is known as a "raster scan" procedure in which the outline of a figure is superimposed on a coordinate system wherein the picture elements are defined by mutually perpendicular x-axis and y-axis pixel lines. Initially, two intersections between a scanning line parallel to the x-axis or y-axis pixel lines and the outline of the figure are obtained. Then, a start point and an end point lying on the scanning line are calculated on the basis of the obtained two intersections, so that image dots are placed on the start and end points and between these start and end points, whereby a line of successive image dots is defined along the scanning line and within the outline of the figure. The scanning line is shifted by an incremental distance corresponding to the size of the picture elements, and the processing steps indicated above are repeated to obtain a next pair of start and end points. The shifting of the scanning line is continued until the entire size of the figure outline is covered by the successive scanning lines. Thus, a batch of bit map data representative of the image dots which fill the entire area within the figure outline is prepared by conversion from the original batch of outline data.

The outlines or contours of figures such as alphabetic letters usually consist of straight segments and curved segments. When the intersections between the scanning line and a curved segment of the outline are obtained, the curved segment is approximated by at least one straight line or segment, usually, a plurality of straight segments. Each of these approximating straight segments is obtained by dividing the curved segment in question into two or more parts, so that each straight segment is a line connecting the opposite ends of the corresponding part of the divided curved segment. The division of the curved segment or sub-division of the parts of the once divided curved segment is continued until the accuracy of approximation of the original curved segment by the straight segments is improved to a desired value, so that a curve defined collectively by the straight segments has a smooth appearance closely approximating the original curved segment of the figure outline as represented by the original outline data of the figure.

In the known printer controllers, the required accuracy of approximation of a curved segment by straight segments is fixed and cannot be changed. Consequently, the required number of straight segments used to approximate a curved segment of a figure outline is fixed depending upon the original curved segment and the fixed accuracy of approximation.

A batch of outline data which represents the straight segments approximating the original outline and which is used to prepare a batch of bit map data will be referred to as approximative outline data. Before a batch of original outline data is converted into a corresponding batch of bit map data, the corresponding batch of approximative outline data is prepared as explained above and temporarily stored in a random-access memory, so that the bit map data are prepared from the stored approximative outline data.

According to the known system, the total number of straight segments approximating the original outline of a figure is extremely large when the original figure outline includes curved segments having a large curvature or many curved segments which define a complicated contour of the outline. Accordingly, the volume of the approximative outline data may exceed the storage capacity of the random-access memory. In some printer controller, the random-access memory has a limited storage area allocated to temporarily store the approximative outline data. Thus, the conventional printer controllers may suffer from a problem that a batch of approximative outline data prepared from a batch of original outline data to generate a batch of bit map data cannot be stored in the appropriate random-access memory, and the bit map data cannot be obtained from the original outline data.

SUMMARY OF THE INVENTION

It is therefore an object of the present invention to provide a printer controller capable of generating a batch of bit map data for a figure, by conversion from a batch of approximative outline data prepared from a batch of original outline data, without suffering from the problem experienced in the prior art, even if the outline of the figure as represented by the original outline data includes large-curvature curves or a large number of curves defining a complicated contour or profile.

It is a second object of the present invention to provide a printer equipped with such a printer controller as indicated above.

The first object may be achieved according to one aspect of this invention, which provides a printer controller operable to generate a batch of bit map data representative of a figure in a matrix of dots formed on a recording medium, by conversion from a batch of original outline data which represents an outline of the figure and which includes at least one set of curved segment data each representative of a curved segment of the outline, the printer controller comprising: (a) an outline data memory for storing the batch of original outline data; (b) a random-access memory for temporarily storing information necessary to perform data processing operations for generating the batch of bit map data; (c) approximating means for performing an approximating operation to prepare a batch of approximative outline data which includes approximating straight segment data representative of at least one straight segment that approximates, with a selected value of approximation accuracy, the curved segment represented by each set of curved segment data of the original outline data, the approximating means preparing the approximating straight segment data from each of the at least one set of curved segment data stored in the outline data memory, and temporarily storing the batch of approximative outline data in the random-access memory, the approximating means reducing the value of approximation accuracy if an amount of an empty area of the random-access memory is insufficient to store the prepared batch of approximative outline data, and repeating the approximating operation until an amount of the prepared batch of approximative outline data is reduced to such an extent that an entirety of the prepared batch of approximative outline data can be stored into the empty area of the random-access memory; (d) data converting means for converting the prepared batch of approximative outline data to a batch of bit map data representative of image dots filling an interior of an outline of a figure represented by the approximative outline data; and (e) a bit map data memory for storing the batch of bit map data obtained by the data converting means.

In the printer controller of the present invention constructed as described above, the value of approximation accuracy used by the approximating means to prepare the approximative outline data from the original outline data is lowered or reduced if the amount of the empty area available for storage of the approximative data in the random-access memory is insufficient to store the prepared approximative outline data. The approximating means operates with the thus reduced value of approximation accuracy, to repeat the approximating operation until the amount of the approximative outline data obtained with the reduced approximation accuracy is reduced to such an extent that the entirety of the approximative data can be stored in the empty area of the random-access memory. Namely, the curved segments of the original outline are approximated by straight lines so as to meet a predetermined or nominal value of approximation accuracy as long as the approximative outline data prepared with the predetermined value of approximation accuracy can be stored in the currently available empty area of the random-access memory. If the thus prepared approximative outline data cannot be wholly stored in the empty area of the memory, then the approximating means is again operated to perform an approximating operation with the approximation accuracy value being reduced by a predetermined amount. An gradual reduction of the approximation accuracy value and an approximating operation are continued until it is found that the empty area of the random-access memory is sufficient to store the prepared approximative outline data.

It will therefore be understood that the present printer controller always permit the conversion of the original outline data into the approximative outline data that can be stored in the empty area of the random-access memory, even if the outline of the figure as represented by the original outline data includes curved segments having a large curvature or a large number of curved segments that define a considerably complicated contour. Consequently, the present printer controller does not require an expensive random-access memory having a large storage capacity for temporarily storing the approximative outline data prior to the conversion into the bit map data.

The approximating means may include detecting means for detecting the amount of the empty area currently available in the random-access memory, and comparing means for comparing the amount of the prepared batch of approximative outline data with the amount of the empty area of the random-access memory detected by the detecting means. The value of approximation accuracy is lowered if the amount of the empty area of the random-access memory is not sufficient to store the approximative outline data prepared with the higher approximation accuracy value.

The present printer controller may be constructed to further comprise disabling means for disabling the approximating means to inhibit its operation when the reduced value of approximation accuracy is smaller than a predetermined lower limit.

The second object may be attained according to a second aspect of the present invention, which provides a printer having a data processing portion operable to generate a batch of bit map data representative of a figure in a matrix of dots, by conversion from a batch of original outline data which represents an outline of the figure and which includes at least one set of curved segment data each representative of a curved segment of the outline, and a printing portion for printing the figure on a recording medium according to the batch of bit map data, the data processing portion comprising: (a) an outline data memory for storing the batch of original outline data; (b) a random-access memory for temporarily storing information necessary to perform data processing operations for generating the batch of bit map data; (c) approximating means for performing an approximating operation to prepare a batch of approximative outline data which includes approximating straight segment data representative of at least one straight segment that approximates, with a selected value of approximation accuracy, the curved segment represented by each set of curved segment data of the original outline data, the approximating means preparing the approximating straight segment data from each of the at least one set of curved segment data stored in the outline data memory, and temporarily storing the batch of approximative outline data in the random-access memory, the approximating means reducing the value of approximation accuracy if an amount of an empty area of the random-access memory detected by the detecting means is insufficient to store the prepared batch of approximative outline data, and repeating the approximating operation until an amount of the prepared batch of approximative outline data is reduced to such an extent that an entirely of the prepared batch of approximative outline data can be stored in the empty area of the random-access memory; (d) data converting means for converting the prepared batch of approximative outline data to a batch of bit map data representative of image dots filling an interior of an outline of a figure represented by the approximative outline data; and (e) a bit map data memory for storing the batch of bit map data obtained by the data converting means.

The present printer has the same advantages as described above with respect to the printer controller.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIGS. 9A, 9B and 9C are illustrations indicating sequential division and sub-divisions of Bezier curves;

FIGS. 10A–10D are illustrations explaining the order of processing of divided parts of a Bezier curve.

DETAILED DESCRIPTION OF THE PREFERRED EMBODIMENT

Figure 1:
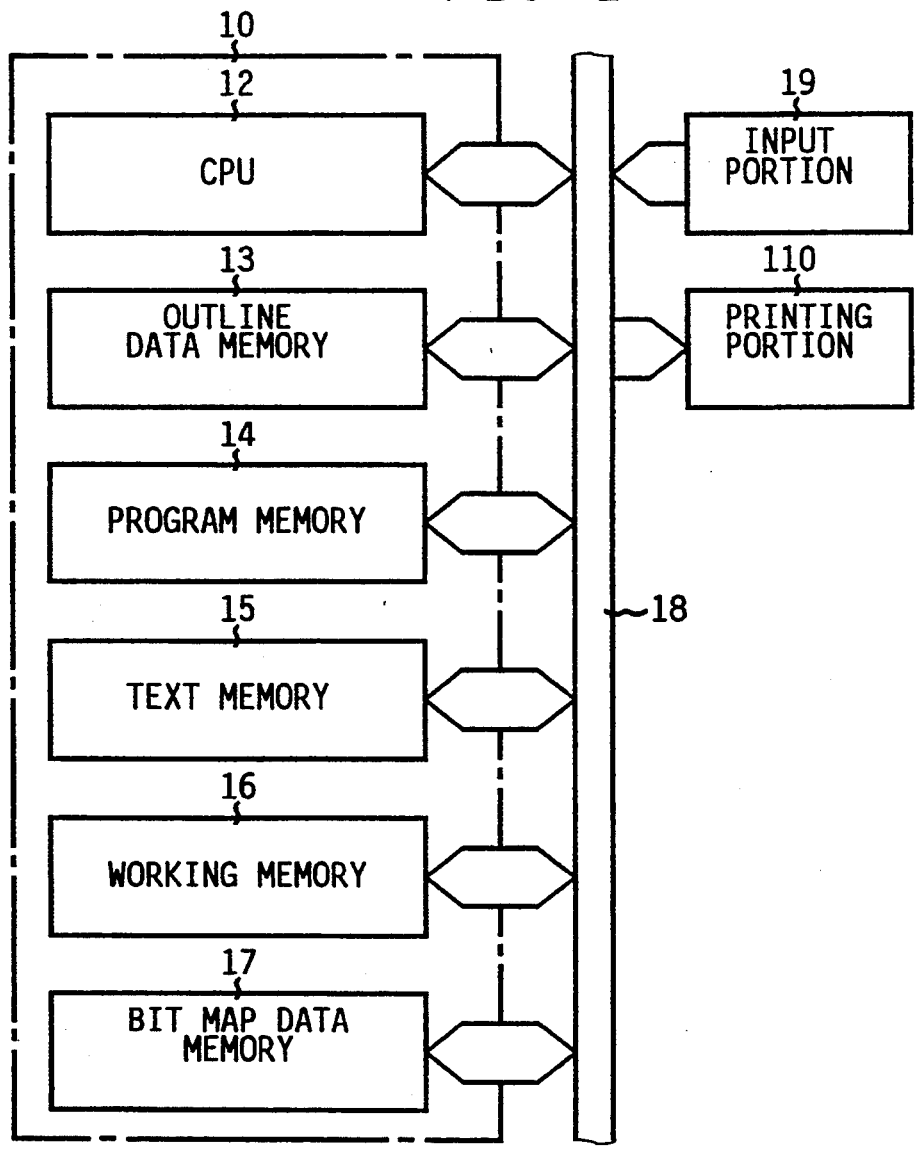
FIG. 1 is a block diagram illustrating one embodiment of a printer equipped with a controller of the present invention.

Referring first to FIG. 1, there is schematically illustrated a dot-matrix laser printer which includes a printing portion 110, an input portion 19, and a controller 10 constructed according to one embodiment of the present invention. The controller 10 receives text data from the input portion 19 and controls the printing portion 110 so that a text represented by the text data is printed in a matrix of dots on a suitable recording medium.

The printer controller 10 consists principally of a microcomputer incorporating a central processing unit (CPU) 12, an OUTLINE DATA memory 13, a PROGRAM memory 14, a TEXT memory 15, a WORKING memory 16, and a BIT MAP DATA memory 17. These elements 12–17 are interconnected with each other through a bus 18, and connected to the input portion 19 and the printing portion 110 also through the bus 18.

The input portion 19 may be a keyboard through which the user enters printing data. Alternatively, the input portion 19 is adapted to receives the printing data from an external device. The printing data include text data representative of a text to be printed, and other data such as a code indicative of a desired size of the characters present in the text. The text data include character codes indicative of respective characters constituting the text to be printed. The text data may also include codes representative of figures other than the characters, or parts of those figures.

The printing portion 110 is adapted to modulate a laser beam according to video signals generated on the basis of bit map data stored in the BIT MAP memory 17. As well known in the art, the modulated laser beam is swept over a recording medium so that a text represented by the text data is printed in the dot matrix fashion, namely, image dots as represented by the bit map data are formed.

The PROGRAM memory 14 is a read-only memory (ROM) which stores various control programs to be executed by the CPU 12 for performing data processing operations necessary to control the printing portion 110. The control programs include programs for the operations illustrated in the flow charts of FIGS. 4, 5 and 7.

The TEXT memory 15 is a random-access memory (RAM) used to store the text data received from the input portion 19. As indicated above, the text data represent characters such as alphabetic letters, numerals and symbols, and may represent any other visible figures or representations.

The WORKING memory 16 is also a random-access memory (RAM) used to temporarily store information necessary for the CPU 12 to perform the data processing operations, for example, approximative outline data which are prepared from original outline data stored in the OUTLINE DATA memory 13 and which are used to prepare the bit map data to be stored in the BIT MAP DATA memory 17.

The BIT MAP DATA memory 17 is used to store the bit map data prepared from the approximative outline data temporarily stored in the WORKING memory 16, as described above. The bit map data represent the positions of the picture elements at which image dots are formed so as to define each character or figure whose outline is defined by a corresponding batch of approximative outline data.

The OUTLINE DATA memory 13 is a read-only memory which stores a batch of original outline data representative of the outline or contour of each character or figure or a part of a figure. The original outline data consist of a plurality of segment data sets each representative of a straight or curved segment of the outline of the character or figure in question (hereinafter referred to as "character outline", when appropriate). That is, the outline of each character consists of a plurality of straight or curved segments. In the present embodiment, third-order Bezier curves are used as as the curved segments of the character outline. Each set of segment data include coordinate data representative of coordinate points defining straight and/or curved segments, and attribute data indicative of flags which specify the kind of the segments (either straight segment or curved segment) defined by the coordinate points, and indicates the start point of the character outline. Each coordinate point is represented by a pair of an x-axis coordinate value and a y-axis coordinate value in an x-y coordinate system in which the positions of the picture elements are defined by mutually perpendicular x-axis and y-axis pixel lines.

Figures 2, 3:
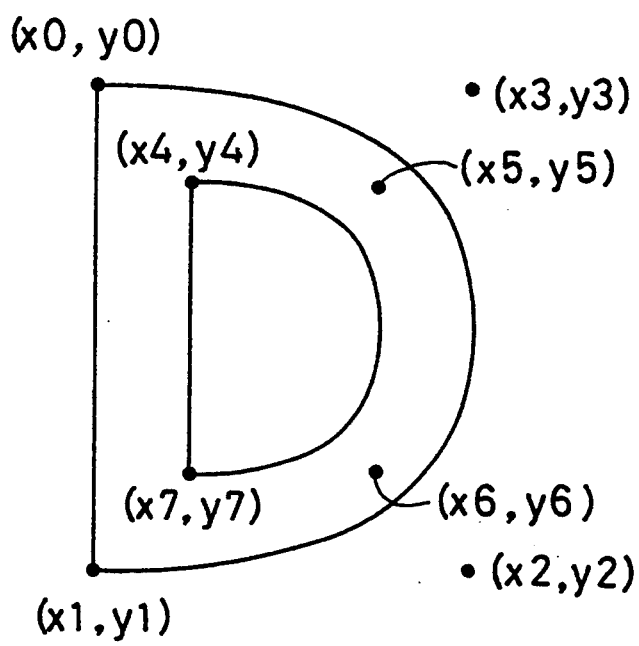
FIG. 2 is a view showing the outline of letter "D" and coordinate points defining the character.
FIG. 3 is a view indicating original outline data for the letter "D" of FIG. 2, which are stored in an outline data memory of the printer controller.

Described in detail referring to FIGS. 2 and 3, the start point of each character outline is represented by attribute data indicative of a start point flag S, and a pair of coordinate values following the flag S. Each straight segment of the outline is represented by attribute data indicative of a straight segment flag L, and a pair of coordinate values which follows the flag L and which define the end point of the straight segment. Each curved segment (Bezier curve) of the outline is represented by attribute data indicative of a Bezier curve flag B, and three pairs of coordinate values following the flag B. The first and second pairs of these three pairs represent respective first and second control points of the curved segment, and the third pair represents the end point of the curved segment. The start point of a straight or curved segment is represented by the pair of coordinate values which represent the end point of the preceding straight or curved segment. The start point of the first segment of the outline is represented by the pair of coordinate values preceded by the start point flag S.

The outline of letter "D" shown in FIG. 2 for illustrative purpose only consists of two straight segments and two curved segments, and a batch of original outline data representative of this outline is illustrated in FIG. 3. This original outline data batch consists of six attribute data flags, and a total of ten pairs of coordinate values.

Figure 4:
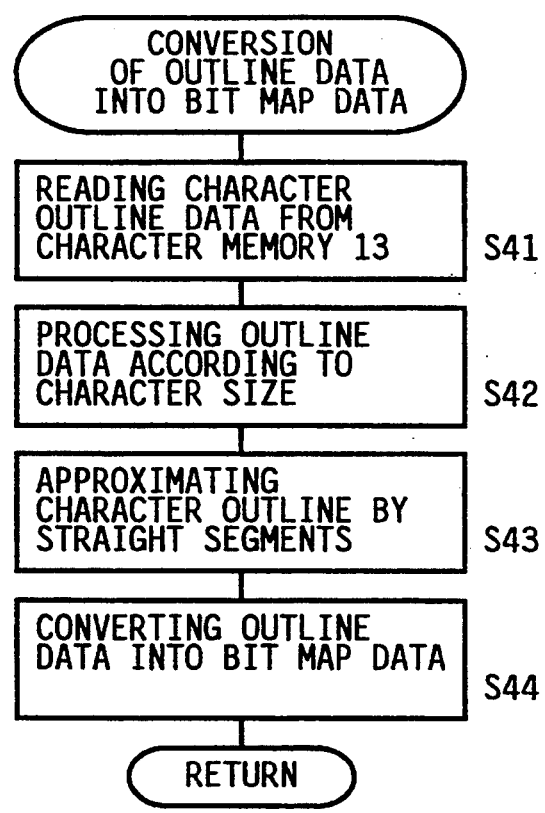
FIG. 4 is a flow chart illustrating a routine for converting the original outline data into bit map data.

The CPU 12 is adapted to execute a routine as illustrated in the flow chart of FIG. 4, according to the control program stored in the PROGRAM memory 14, while utilizing a temporary data storage function of the WORKING memory 16, to prepare a batch of bit map data for each character or figure of the text stored in the TEXT memory 15, by conversion from the corresponding batch of original outline data stored in the OUTLINE DATA memory 13. While the conversion is effected for all the characters or figures of the text stored in the TEXT memory 15, the following description refers to the conversion relating to a given character of the text.

The routine of FIG. 4 is initiated with step S41 in which the batch of original outline data corresponding to the appropriate character code of the text data is read out from the OUTLINE DATA memory 13 and stored in the WORKING memory 16. The control then goes to step S42 in which the batch of original outline data is processed according to the character size code also included in the text data, so that the original outline data conform to the coordinate system adapted for the desired scaling of the characters as specified by the size code. Step S42 is followed by step S43 in which the batch of original outline data is converted to a batch of approximative outline data, by approximating the curved segments of the character outline by suitable straight segments which are determined as described below in detail. The outline as represented by the approximative outline data obtained in step S43 consists of straight segments only. The control flow then goes to step S44 in which the batch of approximative outline data is converted into the corresponding batch of bit map data, according to a raster scanning method as well known in the art. No further explanation on the conversion to be effected in step S44 is deemed necessary, since the manner of this conversion is not essential to understand the principle of the present invention.

Figure 5:
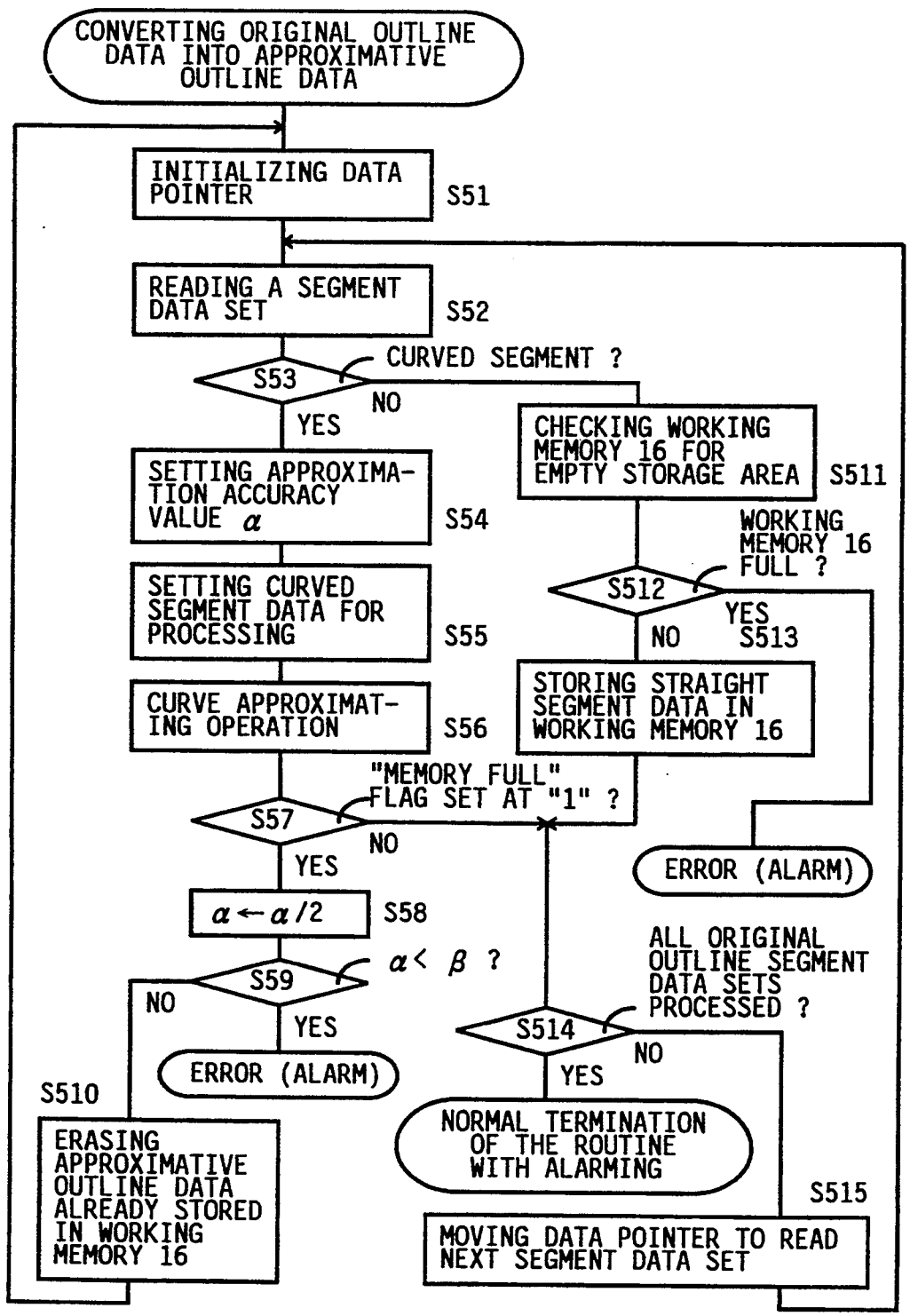
FIG. 5 is a flow chart illustrating a routine for obtaining approximative outline data from original outline data before conversion to the bit map data.

The printer controller 10 is characterized by approximating means constructed to execute step S43 of the routine of FIG. 4 for converting the original outline data into the corresponding approximative outline data. The process step S43 is illustrated in detail in the flow chart of FIG. 5, and a sub-routine in step S56 in FIG. 5 is illustrated in the flow chart of FIG. 7. As is apparent from the following description, this approximating means is constituted by the CPU 12, OUTLINE DATA memory 13, PROGRAM memory 14 and WORKING memory 16.

Referring to the flow chart of FIG. 5, the CPU 12 initially implements step S51 in which a data pointer to sequentially designate segment data sets of the original outline data stored in the WORKING memory 16 in step S41 is set to designate the first segment data set. In the example of FIGS. 2 and 3, the first segment data set represents the first straight segment between the start point (x0, y0) and the end point (x1, y1) and consists of the attribute flags S, L and the two pairs of coordinate values x0, y0, x1, y1. Step S51 is followed by step S52 in which the segment data set designated by the data pointer is read out from the WORKING memory 16, for processing in the following steps. In the first cycle of execution of the routine of FIG. 5, the first segment data set is read out because the data pointer is initially set in step S51 to designate the first segment data set.

Step S52 is followed by step S53 to determine whether the segment represented by the segment data set read out in step S52 is a curved segment. If an affirmative decision (YES) is obtained in step S53, steps S54–S57 are implemented as described below.

Step S54 is provided to set a value $\alpha$ of approximation accuracy which is used in step S56, more precisely in step S61 (which will be described by reference to the flow chart of FIG. 7) to determine whether the curved segment in question can be accurately approximated by a straight segment or segments. This approximation accuracy represents the degree of smoothness of the portions of the outline represented by the approximative outline data, which portions correspond to the curved portions of the outline represented by the original outline data. Explained in more detail referring to FIG. 6, a Bezier curve is defined by a start point $Q_0$, a first control point $Q_1$, a second control point $Q_2$ and an end point $Q_3$. In determining whether this Bezier curve can be approximated by a straight line $Q_0$–$Q_3$ so as to meet the required approximation accuracy value $\alpha$, distances $l_1$ and $l_2$ between the straight line $Q_0$–$Q_3$ and the respective first and second control points $Q_1$, $Q_2$ in the direction perpendicular to the straight line are compared with a threshold value $1/\alpha$. If both of those distances $l_1$ and $l_2$ are smaller than the threshold value $1/\alpha$, it is considered that the straight line $Q_0$–$Q_3$ approximates the Bezier curve so as to meet the required approximation accuracy or smoothness $\alpha$.

In step S54, the approximation accuracy value $\alpha$ is set to a predetermined initial or nominal value unless and until the value $\alpha$ is reduced or lowered in step S58 which will be described. After step S58 is implemented, however, the value $\alpha$ is set to a value as reduced in step S58.

Figure 6:
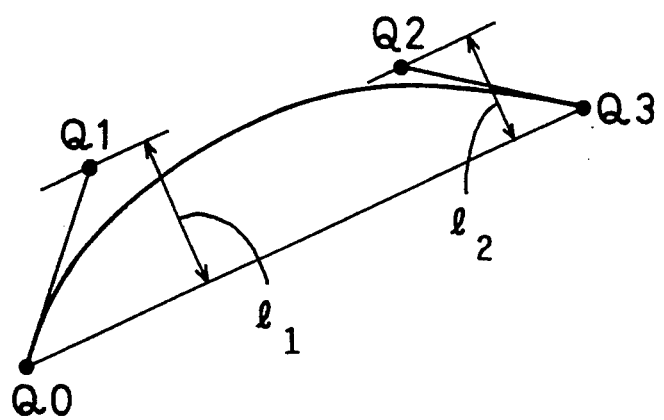
FIG. 6 is an illustration showing distances used to evaluate the accuracy of approximation of an approximating straight segment with respect to a curved segment.

Step S54 is followed by step S55 in which the segment data representative of the curved segment to be processed in the following step S56 are set for processing. The curved segment set in this step S55 is the segment as represented by the segment data set read out in step S52. In the example of FIG. 6, the curved segment defined by the points $Q_0$, $Q_1$, $Q_2$ and $Q_3$ is set in step S55.

Then, the control flow goes to step S56 to perform a curve approximating operation which will be described by reference to the flow chart of FIG. 7. This operation includes step S61 in which the approximation accuracy value $\alpha$ is used.

Step S56 is followed by step S57 to determine whether a MEMORY FULL flag is set at "1" or not. This flag is set to "1" in step S611 if an affirmative decision (YES) is obtained in step S68 of the curve approximating operation in step S56, as illustrated in the flow chart of FIG. 7. Briefly described here, the MEMORY FULL flag is set to "1" if the portion of the WORKING memory 16 assigned to store the approximative outline data is found to be full before the approximative outline data for all segments of the character outline have been stored therein.

If an affirmative decision (YES) is obtained in step S57, step S58 is implemented to reduce the approximation accuracy value $\alpha$ to be set in step S55 in the next execution of the routine of FIG. 5. More specifically, the value $\alpha$ is set to a half of the currently effective value. When step S58 is implemented for the first time, the value $\alpha$ is reduced to a half of the predetermined nominal value. When step S58 is implemented for the second time, the value $\alpha$ is reduced to a quarter of the nominal value.

Step S58 is followed by step S59 to determine whether the approximation accuracy value $\alpha$ reduced in step S58 is smaller than a predetermined lower limit $\beta$. If the value $\alpha$ is smaller than the lower limit $\beta$, the approximative outline data obtained does not assure acceptable smoothness of the curved portions of the character outline, because the numbers of the straight lines approximating those curved portions are not large enough to assure contour smoothness of the character higher than a tolerable limit. If an affirmative decision (YES) is obtained in step S59, the routine of FIG. 5 is terminated. In this case, suitable alarm means is activated to provide an alarm or indication indicating that the conversion of the original outline data to approximative outline data is impossible. If a negative decision (NO) is obtained in step S59, the control goes to step S510 in which approximative outline data if any already stored in the WORKING memory 16 are erased, that is, the assigned portion of the memory 16 is cleared. In this case, the control returns to step S51 to repeat the routine, but with the half-reduced approximation accuracy value $\alpha$.

If the segment data set read out in step S52 represents a straight segment of the character outline, a negative decision (NO) is obtained in step S53, and step S511 is implemented to detect the amount of the empty area of the WORKING memory 16 which is currently available to store the approximative outline data. Step S511 is followed by step S512 to compare the amount of the straight segment data set read out in step S52, with the detected amount of the empty area of the WORKING memory 16. If the detected empty area is insufficient to store the straight segment data set in question, this means that the memory 16 is almost full, and an affirmative decision (YES) is obtained in step S512. In this case, the routine of FIG. 5 is terminated with an alarm provided as in the case of the affirmative decision (YES) obtained in step S59. If a negative decision (NO) is obtained in step S512, that is, if the amount of the straight segment data set read out in step S52 is smaller than the detected amount of the empty area of the WORKING memory 16 assigned to store the approximative outline data, the control goes to step S513 in which the straight segment data set is stored in the memory 16.

Step S513 is followed by step S514. This step S514 is also implemented when a negative decision (NO) is obtained in step S57, that is, when the curve approximating operation in step S56 (illustrated in detail in the flow chart of FIG. 7) is ended with the "MEMORY FULL" flag set to "0" in step S611 as result of a negative decision (NO) in step S68 with respect to a curved segment, after approximative segment data representative of a straight segment or segments approximating the curved segment are stored in the WORKING memory 16 in step S69. In other words, step S514 is implemented each time original or approximative straight segment data have been stored in memory 16 in step S513 or S69. This step S514 is provided to determine whether all segment data sets of the original outline data have been processed in step S56. If any original outline segment data set or sets remain, the control flow goes to step S515 to advance the data pointer to the next segment data set so that the thus designated segment data set is read in step S52. The control then returns to step S52 and implement the following steps as described above.

Referring next to the flow chart of FIG. 7 and illustrations of FIGS. 8, 9A-9C and 10A-10D, the curve approximating operation in step S56 will be described.

Figure 8:
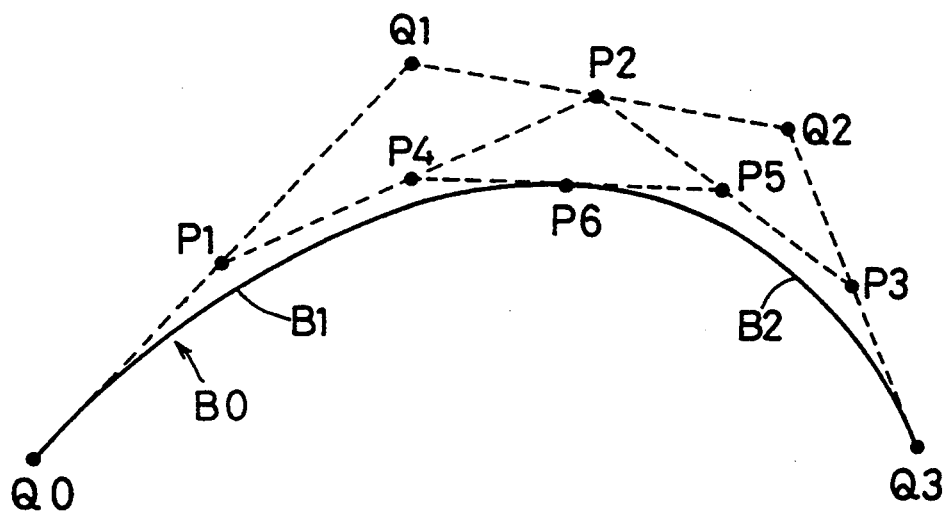
FIG. 8 is an illustration showing division of a third order Bezier curve into two straight segments.

The curve approximating operation is initiated with step S61 to determine whether the curved segment currently set for processing can be approximated by a straight segment connecting the start and end points of the curved segment in question, so as to meet the approximation accuracy value $\alpha$ set in step S54. Initially, this value $\alpha$ is set at the predetermined initial or nominal value. As described above with respect to step S55, a third-order Bezier curved segment defined by points $Q_0$, $Q_1$, $Q_2$, $Q_3$ as illustrated in FIG. 6 is initially set for processing. A similar Bezier curved segment is illustrated in FIG. 8. In FIGS. 6 and 8, the point $Q_0$ is the start point of the curve, which is nearer to the start point of the character outline than the end point $Q_3$.

Described more specifically, step S63 is adapted to calculate the distances $l_1$ and $l_2$ as indicated in FIG. 6, on the basis of the coordinate values of the points $Q_0$, $Q_1$, $Q_2$, $Q_3$, and compare the calculated distances $l_1$ and $l_2$ with a threshold value $1/\alpha$. If these two distances $l_1$ and $l_2$ are both smaller than the threshold value $1/\alpha$, it is considered that the straight segment $Q_0$-$Q_3$ approximates the curved segment so as to meet the required approximation accuracy value $\alpha$. In this case, an affirmative decision (YES) is obtained in step S61, and the control flow goes to steps S67-S69 which will be described.

Usually, the original curved segment to be initially processed has a relatively large curvature like a Bezier curve indicated generally at $B_0$ in FIG. 8, and the distances $l_1$ and $l_2$ are relatively large. Therefore, a negative decision (NO) is obtained in step S61 for most of the original curved segments of the original character outline. In this case, step S61 is followed by step S62 in which the curved segment is divided into two curves. In the case of the original Bezier curve $B_0$ of FIG. 8, the curve $B_0$ is divided into two Bezier curves $B_1$ and $B_2$. As shown in FIG. 8, the original curve $B_0$ is divided at point $P_6$, and the curve $B_1$ is defined by start and end points $Q_0$, $P_6$ and two control points $P_1$, $P_4$, while the curve $B_2$ is defined by start and end points $P_6$, $Q_3$ and two control points $P_5$, $P_3$. The points $P_1$, $P_4$, $P_6$, $P_5$, $P_3$ are calculated on the basis of the coordinate values of the points $Q_0$-$Q_3$ of the original Bezier curve $B_0$ whose coordinate values are known. The point $P_1$ is a midpoint of a straight segment connecting the start point $Q_0$ and the first control point $Q_1$. The point $P_3$ is a midpoint of a straight segment connecting the second control point $Q_1$ and the end point $Q_3$. To calculate the points $P_4$, $P_5$, $P_6$, a midpoint $P_2$ of a straight segment connecting the two control points $Q_1$, $Q_2$ is obtained. The point $P_4$ is a midpoint of a straight segment connecting the points $P_1$ and $P_2$, while the point $P_5$ is a midpoint of a straight segment connecting the points $P_2$ and $P_3$. The point $P_6$ is a midpoint of a straight segment connecting the points $P_4$ and $P_5$.

Thus obtained Bezier curves $B_1$ and $B_2$ also indicated in FIG. 9A are tested in the order of description, for the approximation accuracy of the respective straight segments $Q_0$-$P_6$ and $P_6$-$Q_3$. To this end, the first Bezier curve $B_1$ is set in step S63 so that this curve $B_1$ is first subjected to an approximating operation identical with that applied to the original Bezier curve $B_0$ as described above. This approximating operation is indicated as step S56 following step S63. Further, the second Bezier curve $B_2$ is set in step S65 effected after the approximating operation on the first curve $B_1$, so that the curve $B_2$ is also subjected to an approximating operation indicated as step S56 following step S65.

The curve approximating operations in step S56 following steps S63 and S65 for the curves $B_1$, $B_2$ obtained by the first division of the original Bezier curve $B_0$ are completely identical with the operation as described above with respect to the original curve $B_0$. That is, the operation in step S56 following step S63 begins with step S61 to determine whether the first Bezier curve $B_1$ can be approximated by the straight segment $Q_0$–$P_6$ so as to meet the approximation accuracy value $\alpha$, namely, whether the distances between the straight segment $Q_0$–$P_6$ and the control points $P_1$, $P_4$ are smaller than the threshold value $1/\alpha$. On the other hand, the operation in step S56 following step S65 begins also with step S61 to determine whether the second Bezier curve $B_2$ can be approximated by the straight segment $P_6$–$Q_3$ so as to meet the approximation accuracy value $\alpha$.

If, for example, the Bezier curve $B_2$ cannot be approximated by the straight segment $P_6$–$Q_3$ so as to meet the approximation accuracy value $\alpha$, the decision in step S61 is again negative (NO), and step S62 is implemented to divide the curve $B_2$ into curves $B_{21}$ and $B_{22}$, as indicated in FIG. 9B. Then, each of these curves $B_{21}$ and $B_{22}$ obtained by the sub-division of the curve $B_2$ is subjected to an approximating operation in step S56 following step S63, S65, in the same manner as applied to the curves $B_0$, $B_1$, $B_2$.

If the Bezier curve $B_{22}$ cannot be approximated by the straight segment $P_7$–$Q_3$ so as to meet the approximation accuracy value $\alpha$, the decision in step S61 is again negative (NO), and step S62 is implemented to divide the curve $B_{22}$ into curves $B_{221}$ and $B_{222}$, as indicated in FIG. 9C. Then, each of these curves $B_{221}$ and $B_{222}$ obtained by the sub-division of the curve $B_{22}$ is subjected to an approximating operation in step S56 following step S63, S65, in the same manner as applied to the curves $B_0$, $B_1$, $B_2$, $B_{21}$ and $B_{22}$.

Figure 7:
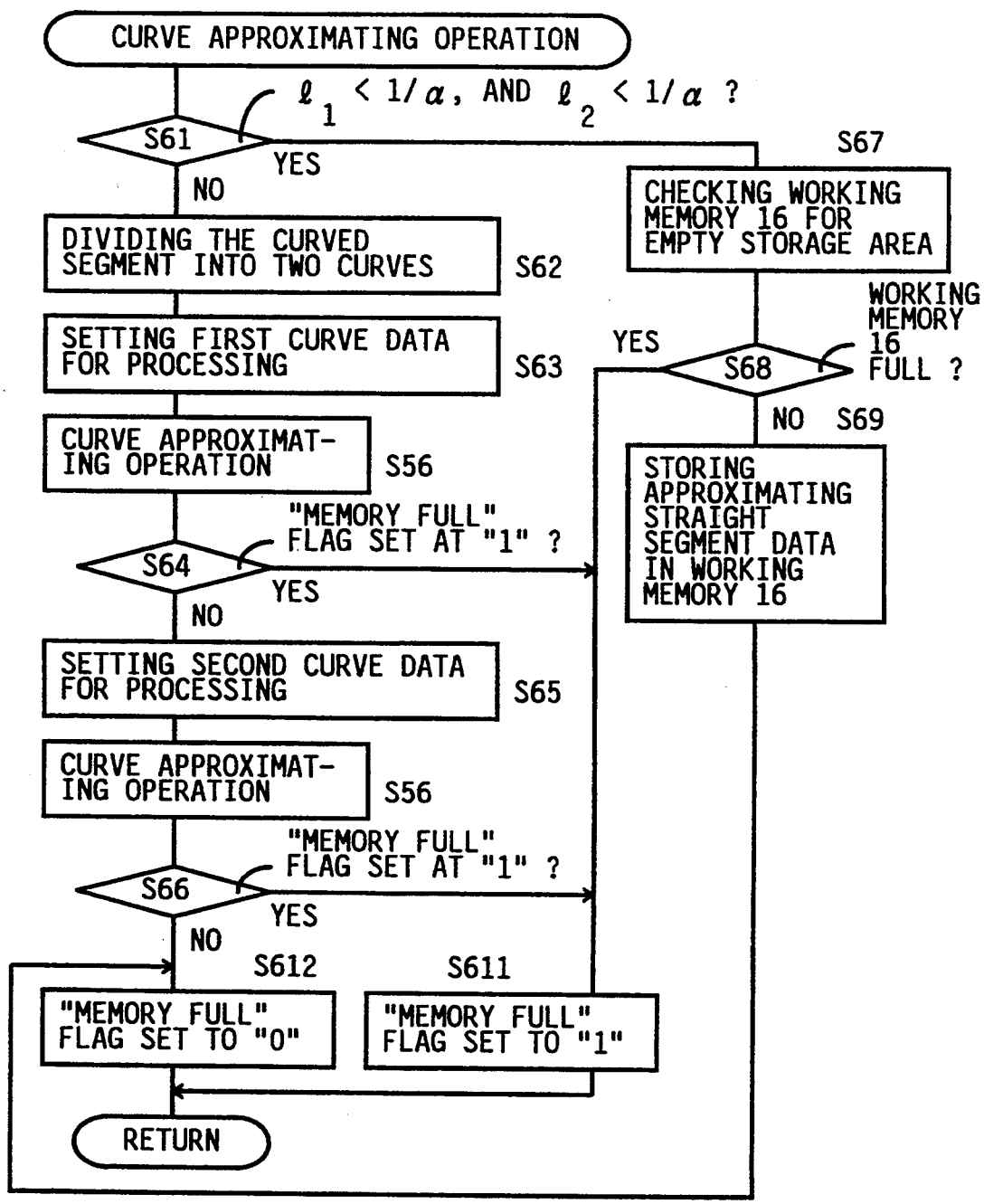
FIG. 7 is a flow chart illustrating details of an approximating operation performed in step S56 in the routine of FIG. 5.

Thus, the approximating operation illustrated in the flow chart of FIG. 7 is performed in a recursive fashion, with respect to Bezier curves obtained by repeated division and sub-divisions as needed until the approximation accuracy value $\alpha$ is achieved and an affirmative decision (YES) is obtained in step S61 during repeated execution of the routine of FIG. 7. For instance, the approximation accuracy value $\alpha$ may be achieved for straight segments $P_7$–$P_8$ and $P_8$–$Q_3$ with respect to the curves $B_{221}$, $B_{222}$ of FIG. 9C.

Since two curves obtained by dividing a parent curve usually have different values of curvature, it is possible that the approximation accuracy value $\alpha$ is achieved for only one of the two curves obtained by division. For instance, the approximation accuracy value $\alpha$ is achieved for only the curve $B_{21}$ of FIG. 9B. In this case, only the curve $B_{21}$ is further divided into the curves $B_{221}$ and $B_{222}$, which are then subjected to the approximating operation.

While step S64 to check the MEMORY FULL flag is implemented after the approximating operation for the first curve $B_1$, $B_{21}$, $B_{221}$, etc. and the the approximating operation for the second curve $B_2$, $B_{22}$, $B_{222}$, etc., the significance of this step S64 will be apparent from the following description of steps S67–S69, S611 and S612.

When the affirmative decision (YES) is obtained in step S61 for the first curve $B_{21}$ of FIG. 9B, for example, step S67 is implemented to detect the amount of the empty area of the WORKING memory 16 currently available for storing the approximative outline data. Then, the control flow goes to step S68 to determine whether the amount of the straight segment data representative of the straight segment $P_6$–$P_7$ approximating the curve $B_{21}$ is larger than the detected amount of the empty area of the memory 16. If so, the portion of the memory 16 assigned to store the approximative outline data cannot store the data for the straight segment $P_6$–$P_7$. In this case, an affirmative decision (YES) is obtained in step S68, and the control flow goes to step S611 in which the MEMORY FULL flag is set to "1". Thus, the approximating operation for the first curve $B_{21}$ set in step S63 is terminated without storing the data for the straight segment $P_6$–$P_7$ in the memory 16.

In the above case, the approximating operation for the second curve $B_{22}$ will not be performed, since the MEMORY FULL flag has been set to "1" in step S611 and an affirmative decision (YES) is obtained in step S64 following the approximating operation for the first curve $B_{21}$.

On the other hand, if the amount of the straight segment data for the straight segment $P_6$–$P_7$ approximating the first curve $B_{21}$ is not larger than the detected amount of the empty area of the memory 16, the data the straight segment $P_6$–$P_7$ can be stored in the currently empty area of the memory 16. In this case, a negative decision (NO) is obtained in step S68, and step S69 is implemented to store the data for the segment $P_6$–$P_7$ in the memory 16. Then, the control flow goes to step S612 in which the MEMORY FULL flag is set to "0". Thus, the approximating operation for the curve $B_{21}$ is terminated, after the data for the segment $P_6$–$P_7$ are stored in the memory 16.

In the above case, the negative decision (NO) is obtained in step S64 because the MEMORY FULL flag has been set to "0" in step S612, whereby the approximating operation for the second curve $B_{22}$ is performed following step S65 in which the curve $B_{22}$ is set for processing. This approximating operation for the second curve $B_{22}$ is identical with that for the first curve $B_{21}$. If the negative decision (NO) is obtained in step S68 in the approximating operation for the curve $B_{22}$, the data for the straight segment $P_7$–$Q_3$ approximating the second curve $B_{22}$ are stored in the memory 16, and the MEMORY FULL flag is set to "0" in step S612. If the affirmative decision (YES) is obtained in step S68, on the other hand, the MEMORY FULL flag is set to "1" in step S611, and the data for the straight segment $P_7$–$Q_3$ for the second curve $B_{22}$ will not be stored in the memory 16.

It will be understood that the MEMORY FULL flag is set to "1" in step S611 if the detected amount of the empty area of the memory 16 is not sufficient to store the straight segment data representative of the straight segment approximating the original curve $B_0$ or any curve obtained by division or sub-division of the parent curve (e.g., $B_1$, $B_2$, $B_{21}$, $B_{22}$, $B_{221}$, $B_{222}$). It will also be understood that the MEMORY FULL flag is set to "1" only after a relatively large amount of the approximative outline data (consisting of successive sets of straight segment data sets) has been stored. In other words, the MEMORY FULL flag is set to "1" during an approximating operation in step S56 of FIG. 5 (FIG. 7) performed on a curved segment which is considerably remote from the start point of the character represented by the original outline data batch.

If it is found that a batch of original outline data cannot be converted into the corresponding batch of approximative outline data, with the MEMORY FULL flag set to "1" during an approximating operation on a given curved segment of the original outline, the approximating operation in step S56 of FIG. 5 is repeated with the approximation accuracy value $\alpha$ reduced to a one-half value of the currently effective value. To this end, step S56 of the routine of FIG. 5 is followed by step S57 to determine whether the MEMORY FULL flag is set at "1" or not.

If the MEMORY FULL flag is not set at "1", that is, if this flag is set at "0", the control flow goes to step S514, and the next segment of the character outline is processed as described above with respect to step S515. If the MEMORY FULL flag is set at "1", step S57 is followed by step S58 to reduce the approximation accuracy value $\alpha$ to one-half value of the currently effective value set in step S54. In the next cycle of execution of the routine of FIG. 5, the value $\alpha$ is set to the value reduced in step S58. As a result, the threshold value $1/\alpha$ used in step S61 is accordingly increased, that is, doubled, so that there is an increased possibility that the distances $l_1$, $l_2$ as indicated in FIG. 6 are smaller than the threshold value $1/\alpha$. In other words, the reduction of the approximation accuracy value $\alpha$ increases the possibility that the affirmative decision (YES) is obtained in step S61 with a relatively small number of divisions of the original curved segment $B_0$. Accordingly, the total number of the straight segments approximating the original curved segment so as to meet the approximation accuracy value $\alpha$ is reduced, whereby the total amount of the straight segment data approximating the original curved segment data is accordingly reduced. Consequently, there is an increased possibility that the data representative of all straight segments approximating the original curved segment can be stored in the WORKING memory 16. In other words, the reduction of the approximation accuracy value $\alpha$ increases a possibility that a batch of approximative outline data obtained from the corresponding batch of original outline data stored in the OUTLINE DATA memory 13 can be temporarily stored in the WORKING memory 16 before it is converted into the corresponding batch of bit map data to be stored in the BIT MAP memory 17.

Referring to FIGS. 10A–10D, the order of processing of divided curved segments of a Bezier curve will be explained, by way of example only. In FIG. 10A, an original Bezier curve has a start point $Q_0$ nearer to the start point of the character outline in question, and an end point $Q_3$ nearer to the end point of the character outline. In FIGS. 10A–10D, solid lines and broken lines indicate the segments for which the negative decision (NO) and the affirmative decision (YES) are obtained in step S61, respectively. In the following description, each curved segment is expressed by its start and end points.

FIG. 10A shows the original Bezier curve $Q_0$–$Q_3$ as divided into a first curve $Q_0$–$P_6$ and a second curve $P_6$–$Q_3$ as a result of the negative decision (NO) in step S61. As described above, these two curves $Q_0$–$P_6$ and $P_6$–$Q_3$ are processed in this order. If the negative decision (NO) is obtained in step S61 for the initially processed first curve $Q_0$–$P_6$, this curve is divided in step S62 into two curves $Q_0$–$P_7$ and $P_7$–$P_6$ before the second curve $P_6$–$Q_3$ is processed. Thus, (1) the segment $Q_0$–$P_6$ is the first segment to be processed.

Then, the two curves $Q_0$–$P_7$ and $P_7$–$P_6$ of the segment $Q_0$–$P_6$ are processed in this order. If the negative decision (NO) is obtained in step S61 for the curve $Q_0$–$P_7$ as indicated by solid line in FIG. 10B, this curve is divided into two curves $Q_0$–$P_8$ and $P_8$–$P_7$, before the curve $P_7$–$P_6$ is processed. Thus, (2) the segment $Q_0$–$P_7$ is the second segment to be processed.

Then, the two curves $Q_0$–$P_8$ and $P_8$–$P_7$ of the segment $Q_0$–$P_7$ are processed in this order. If the negative decision (NO) is obtained in step S61 for the curve $Q_0$–$P_8$ as indicated by solid line in FIG. 10C, this curve is divided into two curves $Q_0$–$P_9$ and $P_9$–$P_8$, before the curve $P_8$–$P_7$ is processed. Thus, (3) the segment $Q_0$–$P_8$ is the third segment to be processed.

Then, the two curves $Q_0$–$P_9$ and $P_9$–$P_8$ of the segment $Q_0$–$P_8$ are processed in this order. If the affirmative decision (YES) is obtained in step S61 for the curve $Q_0$–$P_9$ as indicated by broken line in FIG. 10D, the data representative of an approximating straight segment $Q_0$–$P_9$ are stored in the WORKING memory 16 in step S69 if the negative decision (NO) is obtained in step S68. Thus, (4) the segment $Q_0$–$P_9$ is the fourth segment to be processed.

In this condition, the MEMORY FULL flag is set at "0" (because step S69 is followed by step S612), and the negative decision (NO) is obtained in step S64. Therefore, the segment $P_9$–$P_8$ is processed. If the affirmative decision (YES) is obtained in step S61 for the segment $P_9$–$P_8$ as also indicated by broken line in FIG. 10D, the data representative of an approximating straight segment $P_9$–$P_8$ are stored in the memory 16 in step S69 if the negative decision (NO) is obtained in step S68. Thus, (5) the segment $P_9$–$P_8$ is the fifth segment to be processed.

In this condition, the MEMORY FULL flag is still set at "0" since step S66 is followed by step S612, and the control proceeds to process the segment $P_8$–$P_7$. If the affirmative decision (YES) is obtained in step S61 for this segment $P_8$–$P_7$ as indicated by broken line in FIG. 10C, the data representative of an approximating straight segment $P_8$–$P_7$ are stored in the memory 16 in step S69. Thus, (6) the segment $P_8$–$P_7$ is the sixth segment to be processed.

Since the MEMORY FULL flag is still set at "0", the control proceeds to process the segment $P_7$–$P_6$. If the affirmative decision (YES) is obtained in step S61 for this segment $P_7$–$P_6$ as indicated by broken line in FIG. 10B, the data representative of an approximating straight segment $P_7$–$P_6$ are stored in the memory 16 in step S69. Thus, (7) the segment $P_7$–$P_6$ is the seventh segment to be processed.

With the MEMORY FULL flag still set at "0", the control proceeds to process the segment $P_6$–$Q_3$. If the affirmative decision (YES) is obtained in step S61 for this segment $P_6$–$Q_3$ as indicated by broken line in FIG. 10A, the data representative of an approximating straight segment $P_6$–$Q_3$ are stored in the memory 16 in step S69. Thus, (8) the segment $P_6$–$Q_3$ is the eighth segment to be processed.

As described above by reference to FIGS. 10A–10D for illustrative purpose, the determination in step S62 and the division in step S62 are effected in a recursive fashion until the affirmative decision (YES) is obtained in step S61. The second divided part of each segment under processing is processed only after the affirmative decision (YES) is obtained in step S61 and the negative decision (NO) is obtained in step S68 for the first divided part. In this specific example, the following segments of the original curve $Q_0$–$Q_3$ are processed in the following order as indicated above:

(1) $Q_0$–$P_6$
(2) $Q_0$–$P_7$
(3) $Q_0$–$P_8$
(4) $Q_0$–$P_9$
(5) $P_9$–$P_8$
(6) $P_8$–$P_7$
(7) $P_7$–$P_6$
(8) $P_6$–$Q_3$

With the sequential processing indicated above, the segment data sets for the following approximating straight segments for the original curve $Q_0$–$Q_3$ are stored in the memory 16 in the following order:

(a) $Q_0$–$P_9$
(b) $P_9$–$P_8$
(c) $P_8$–$P_7$
(4) $P_7$–$P_6$
(5) $P_6$–$Q_3$

Steps S64, 66, S68, S611, S622 are provided to terminate the approximating operation of the original curved segment in question at any time when the negative decision (NO) is obtained in step S68, that is, when it is found that a segment data set representative of any approximating straight segment cannot be stored in the currently available empty area of the WORKING memory 16.

In the embodiment of FIGS. 5 and 7, suitable alarm means is activated when the affirmative decision (YES) is obtained in step S512, namely, when it is found that the detected amount of the empty area of the memory 16 is insufficient to store a straight segment data set. This arrangement is based on a fact that the total amount of the straight segment data sets of the original outline data is comparatively considerably smaller than the total amount of the straight segment data sets of the approximative outline data approximating the curved segments of the original outline. This fact means that there is a low possibility that the memory 16 becomes full due to the storage of a set of straight segment data, even when this straight segment data set is near or at the end of the original outline data batch.

Figure 11:
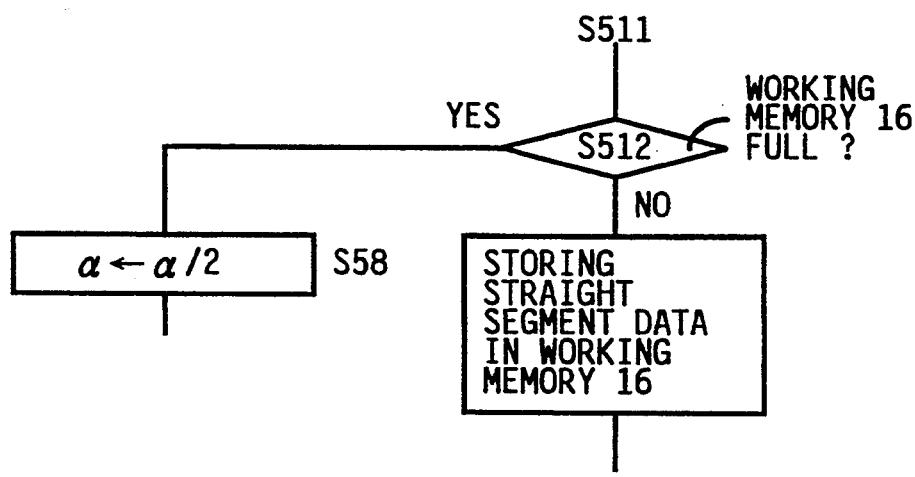
FIG. 11 is a fragmentary flow chart illustrating a modified embodiment of the invention.

However, it is possible to reduce the approximation accuracy value $\alpha$ for the curved segments and repeat the approximating operations for the curved segments, also in the event that the affirmative decision (YES) is obtained in step S512. In this arrangement, step S512 is followed by step S58 if the affirmative decision (YES) is obtained in step S512, as illustrated in the flow chart of FIG. 11.

While the present invention has been described in its presently preferred embodiments with a certain degree of particularity, it is to be understood that the invention is not limited to the details of the illustrated embodiments, but may be embodied with various changes, modifications and improvements, which may occur to those skilled in the art, without departing from the spirit and scope of the invention defined in the appended claims.

For instance, the printer controller 10 adapted to control a laser printer may be modified to serve as a controller for not only various types of printer other than a laser printer, but also display devices.

The principle of the present invention is applicable to original outline data representative of the outlines or contours of any figures, shapes, forms, icons, patterns or any other visible representations other than characters such as letters, numerals and symbols.

Although the approximation accuracy value $\alpha$ used in step S59 is held at a predetermined initial or nominal value until step S58 is implemented and the value $\alpha$ is automatically reduced by implementation of step S58, it is possible that the value $\alpha$ may be set and changed by the user by means of a keyboard or other input means provided for the printer, or set and changed by a command received from an external host computer, for example.

In the illustrated embodiments of FIGS. 5, 7 and 10A–10D, all the curved segments for a character are subjected to approximating operations after the approximation accuracy value $\alpha$ is reduced in step S58 in the case of the affirmative decision in step S68 (S57. However, it is possible that only the curved segment involved in the affirmative decision in step S68 is subjected to an approximating operation with the reduced approximation accuracy value $\alpha$.

While the raster scanning method is utilized for converting the approximative outline data into the bit map data, other methods may be utilized for this conversion.

What is claimed is:

1. A printer controller operable to generate a batch of bit map data representative of a figure in a matrix of dots formed on a recording medium, by conversion from a batch of original outline data which represents an outline of said figure and which includes at least one set of curved segment data each representative of a curved segment of said outline, said printer controller comprising:

an outline data memory for storing said batch of original outline data;

a random-access memory for temporarily storing information necessary to perform data processing operations for generating said batch of bit map data;

approximating means for performing an approximating operation to prepare a batch of approximative outline data which includes approximating straight segment data representative of at least one straight segment that approximates, with a selected value of approximation accuracy, said curved segment represented by each set of curved segment data of said original outline data, said approximating means preparing said approximating straight segment data from each of said at least one set of curved segment data stored in said outline data memory, and temporarily storing said batch of approximative outline data in said random-access memory, said approximating means reducing said value of approximation accuracy if an amount of an empty area of said random-access memory is insufficient to store said prepared batch of approximative outline data, and repeating said approximating operation until an amount of said prepared batch of approximative outline data is reduced to such an extent that an entirety of said prepared batch of approximative outline data can be stored into said empty area of said random-access memory;

data converting means for converting said prepared batch of approximative outline data to a batch of bit map data representative of image dots filling an interior of an outline of a figure represented by said approximative outline data; and a bit map data memory for storing said batch of bit map data obtained by said data converting means.

2. A printer controller according to claim 1, wherein said approximating means includes:
   detecting means for detecting the amount of the empty area currently available in said random-access memory; and
   comparing means for comparing the amount of said prepared batch of approximative outline data with the amount of the empty area of said random-access memory detected by said detecting means.

3. A printer controller according to claim 1, further comprising disabling means for disabling said approximating means when the reduced value of approximation accuracy is smaller than a predetermined lower limit.

4. A printer controller according to claim 3, further comprising alarming means for providing information indicating that the approximation of said batch of original outline data by said batch of approximative outline data is impossible, when said disabling means disables said approximating means.

5. A printer controller according to claim 1, wherein said approximating means includes:
   determining means for determining whether a value of approximation accuracy of a straight segment which approximates the curved segment of said original outline data is greater than said selected value;
   dividing means for dividing said curved segment into two curves and preparing two sets of divided curved segment data representative of said two curves, if said determining means provides a negative decision; and
   repeating means for repeatedly activating said approximating means and said dividing means, with said curved segment replaced by each of said two curves, until said determining means provides an affirmative decision.

6. A printer controller according to claim 5, wherein each of said at least one set of curved segment data of said original outline data stored in said outline data memory represents a Bezier curve defined by a start point, an end point and two control points which correspond to said start and end points, respectively, said dividing means obtaining a midpoint of a first straight segment connecting said start point and one of said two control points which corresponds to said start point, a midpoint of a second straight segment connecting said two control points, a midpoint of a third straight segment connecting said end point and the other of said two control points, a midpoint of a fourth straight segment connecting the midpoints of said first and second straight segments, a midpoint of a fifth straight segment connecting the midpoints of said second and third straight segments, a midpoint of said sixth straight segment connecting the midpoints of said fourth and fifth straight segments, said dividing means dividing said Bezier curve into two curves, at the midpoint of said sixth straight segment.

7. A printer controller according to claim 1, further comprising reading means for sequentially reading out from said outline data memory sets of segment data representative of respective segments of the outline of said figure, said original outline data including attribute data indicative of flags for discrimination between curved segments and straight segments, and coordinate data representative of coordinate values defining each of said curved and straight segments, said approximating means being operable when each of said flags of said attribute data read out by said reading means represents a curved segment.

8. A printer having a data processing portion operable to generate a batch of bit map data representative of a figure in a matrix of dots, by conversion from a batch of original outline data which represents an outline of said figure and which includes at least one set of curved segment data each representative of a curved segment of said outline, and a printing portion for printing said figure on a recording medium according to said batch of bit map data, said data processing portion comprising:
   an outline data memory for storing said batch of original outline data;
   a random-access memory for temporarily storing information necessary to perform data processing operations for generating said batch of bit map data;
   approximating means for performing an approximating operation to prepare a batch of approximative outline data which includes approximating straight segment data representative of at least one straight segment that approximates, with a selected value of approximation accuracy, said curved segment represented by each set of curved segment data of said original outline data, said approximating means preparing said approximating straight segment data from each of said at least one set of curved segment data stored in said outline data memory, and temporarily storing said batch of approximative outline data in said random-access memory,
   said approximating means reducing said value of approximation accuracy if an amount of an empty area of said random-access memory detected by said detecting means is insufficient to store said prepared batch of approximative outline data, and repeating said approximating operation until an amount of said prepared batch of approximative outline data is reduced to such an extent that an entirely of said prepared batch of approximative outline data can be stored in said empty area of said random-access memory;
   data converting means for converting said prepared batch of approximative outline data to a batch of bit map data representative of image dots filling an interior of an outline of a figure represented by said approximative outline data; and
   a bit map data memory for storing said batch of bit map data obtained by said data converting means.

9. A printer according to claim 8, wherein said approximating means includes:
   detecting means for detecting the amount of the empty area currently available in said random-access memory; and
   comparing means for comparing the amount of said prepared batch of approximative outline data with the amount of the empty area of said random-access memory detected by said detecting means.

10. A printer according to claim 8, wherein said outline data memory comprises a portion for storing sets of character outline data representative of outlines of a plurality of characters;
    input means for entering codes representative of said plurality of characters; and
    reading means for reading out from said outline data memory character outline data said sets of character outline data which are represented by said codes entered through said input means.

11. A printer according to claim 10, further comprising a text memory for storing text data representative of said codes entered through said input means.

12. A printer according to claim 10, further comprising size changing means for processing said character outline data read out from said outline data memory, to change a size of the characters.

* * * * *